(12) United States Patent
Lev-Tov et al.

(10) Patent No.: US 10,459,995 B2
(45) Date of Patent: Oct. 29, 2019

(54) SEARCH ENGINE FOR PROCESSING IMAGE SEARCH QUERIES IN MULTIPLE LANGUAGES

(71) Applicant: SHUTTERSTOCK, INC., New York, NY (US)

(72) Inventors: Manor Lev-Tov, Brooklyn, NY (US); Nicholas Alexander Lineback, Denver, CO (US); Heath Hohwald, Logrono (ES)

(73) Assignee: SHUTTERSTOCK, INC., New York, NY (US)

( * ) Notice: Subject to any disclaimer, the term of this patent is extended or adjusted under 35 U.S.C. 154(b) by 288 days.

(21) Appl. No.: 15/448,081

(22) Filed: Mar. 2, 2017

(65) Prior Publication Data

US 2018/0232451 A1 Aug. 16, 2018

Related U.S. Application Data

(60) Provisional application No. 62/438,168, filed on Dec. 22, 2016.

(51) Int. Cl.
*G06F 16/30* (2019.01)
*G06F 16/9535* (2019.01)
(Continued)

(52) U.S. Cl.
CPC ........ *G06F 16/9535* (2019.01); *G06F 16/248* (2019.01); *G06F 16/51* (2019.01);
(Continued)

(58) Field of Classification Search
CPC ...... G06F 16/9535; G06F 16/51; G06F 16/56; G06F 16/248; G06F 16/5854; G06N 3/08
See application file for complete search history.

(56) References Cited

U.S. PATENT DOCUMENTS 7,761,464 B2 * 7/2010 Radlinski ............ G06F 16/9535
707/769
8,838,583 B1 * 9/2014 Fox .................... G06Q 30/0207
707/723
(Continued)

FOREIGN PATENT DOCUMENTS

EP 1267280 A2 12/2002

OTHER PUBLICATIONS

Diversifying Image Search result, Geetha et al dated Aug. 24, 2016.*
(Continued)

*Primary Examiner* — Tarek Chbouki
(74) *Attorney, Agent, or Firm* — McDermott Will & Emery LLP

(57) ABSTRACT

A method for receiving an input user query from a user in any of multiple languages and creating an input user query vector for the input user query is provided. The input user query vector has a length equal to a pre-selected length determined by a dimension of a multimodal space. The method includes associating an image vector to the input user query vector in the multimodal space, the image vector having the pre-selected length, identifying, from an image database, an image associated with the image vector, and providing the image for display to the user in a results panel of a user interface. A system configured to perform the above method is also provided.

19 Claims, 10 Drawing Sheets

(51) Int. Cl.
*G06F 16/51* (2019.01)
*G06F 16/56* (2019.01)
*G06F 16/248* (2019.01)
*G06N 3/08* (2006.01)
*G06F 16/583* (2019.01)

(52) U.S. Cl.
CPC .......... *G06F 16/56* (2019.01); *G06F 16/5854* (2019.01); *G06N 3/08* (2013.01)

(56) References Cited

U.S. PATENT DOCUMENTS

| | | | |
|---|---|---|---|
| 2008/0172637 A1 | 7/2008 | Chang | |
| 2009/0048820 A1 | 2/2009 | Buccella | |
| 2010/0125568 A1* | 5/2010 | van Zwol | G06F 16/583 707/722 |
| 2011/0235902 A1* | 9/2011 | Chittar | G06K 9/3208 382/162 |
| 2012/0124034 A1* | 5/2012 | Jing | G06K 9/6254 707/722 |
| 2012/0254076 A1* | 10/2012 | Yang | G06F 16/54 706/12 |
| 2013/0231916 A1 | 9/2013 | Huerta | |
| 2014/0188899 A1* | 7/2014 | Whitnah | G06Q 10/10 707/749 |
| 2014/0188931 A1 | 7/2014 | Smiling et al. | |
| 2014/0324913 A1 | 10/2014 | Morris et al. | |
| 2015/0213025 A1* | 7/2015 | Sennhauser | G06F 16/9535 707/728 |
| 2015/0227626 A1* | 8/2015 | Mahapatra | G06F 16/951 707/706 |
| 2015/0310010 A1 | 10/2015 | Brenner et al. | |
| 2015/0324365 A1* | 11/2015 | Becker | G06F 16/24578 707/723 |
| 2016/0124958 A1* | 5/2016 | Sinha | G06F 16/9535 707/733 |
| 2016/0210532 A1 | 7/2016 | Soldevila et al. | |
| 2016/0342586 A1 | 11/2016 | Cuthbert | |
| 2016/0364625 A1* | 12/2016 | Lin | G06T 7/60 |
| 2017/0061250 A1* | 3/2017 | Gao | G06F 16/3347 |
| 2017/0243081 A1 | 8/2017 | Abou Mahmoud | |
| 2017/0337733 A1* | 11/2017 | Georgescu | G06T 7/97 |
| 2017/0372398 A1* | 12/2017 | Kopru | G06Q 30/0627 |
| 2018/0157916 A1* | 6/2018 | Doumbouya | G06K 9/00268 |

OTHER PUBLICATIONS

Donahue, et al., "DeCAF: a Deep Convolutional Activation Feature for Generic Visual Recognition," arXiv: 1310.1531v1 [cs.CV] Oct. 6, 2013, 10 pages.

International Search Report and Written Opinion from PCT/US2017/067837, dated Apr. 18, 2018, 16 pages.

* cited by examiner

SEARCH ENGINE FOR PROCESSING IMAGE SEARCH QUERIES IN MULTIPLE LANGUAGES

CROSS-REFERENCE TO RELATED APPLICATIONS

This application claims the benefit of priority from U.S. Provisional Patent Application No. 62/438,168, titled "SEARCH ENGINE FOR PROCESSING IMAGE SEARCH QUERIES IN MULTIPLE LANGUAGES," filed Dec. 22, 2016, to Manor Lev-Tov, et-al., the contents of which are incorporated by reference herein for all purposes.

BACKGROUND

Field

The present disclosure generally relates to search engines configured to receive queries in multiple languages. More specifically, the present disclosure relates to search engines including learned models that adapt user behavioral data to multiple queries in multiple languages.

Description of the Related Art

Search engines associated with a multimedia database commonly have the limitation of being targeted to a specific language. Current attempts to overcome this limitation include textual translation engines that perform a term-by-term translation of a textual query between two languages. Further, some applications include language identification routines that automatically select the target language as the user types the text for a query, without a specific language designation by the user. However, even when the language detection is accurate, which is not always the case, a textual translation is not suitable to overcome language idiosyncrasies (e.g., jargon, popular expressions and phrases, and the like), which eventually lead to incorrect matchings and a frustrating experience for the user.

SUMMARY

In one embodiment of the present disclosure, a method is described for receiving an input user query from a user in any of multiple languages and creating an input user query vector for the input user query. The input user query vector has a length equal to a pre-selected length determined by a dimension of a multimodal space, and the method includes associating an image vector to the input user query vector in the multimodal space, the image vector having the pre-selected length. The method also includes identifying, form an image database, an image associated with the image vector, and providing the image for display to the user in a results panel of a user interface.

According to one embodiment, a system is described that includes one or more processors and a memory coupled to the one or more processors, the memory including instructions that, when executed by the one or more processors, cause the one or more processors to receive an input user query from a user in any of multiple languages and to create an input user query vector for the input user query, the input user query vector having a length equal to a pre-selected length determined by a dimension of a multimodal space. The memory also includes instructions to associate an image vector to the input user query vector in the multimodal space, the image vector having the pre-selected length, to identify, from an image database, an image associated with the image vector, and to provide the image for display to the user in a results panel of a user interface.

According to one embodiment, a non-transitory, machine readable medium is described that includes instructions, which when executed by one or more processors, cause a computer to perform a method for receiving an input user query from a user in any of multiple languages and creating an input user query vector for the input user query. The input user query vector has a length equal to a pre-selected length determined by a dimension of a multimodal space, and the method includes associating an image vector to the input user query vector in the multimodal space, the image vector having the pre-selected length. The method also includes identifying, from an image database, an image associated with the image vector, and providing the image for display to the user in a results panel of a user interface.

In yet other embodiment, a system is described that includes a means for storing commands and a means for executing the commands causing the system to perform a method including the steps of receiving an input user query from a user in any of multiple languages and creating an input user query vector for the input user query. The input user query vector has a length equal to a pre-selected length determined by a dimension of a multimodal space, and the method includes associating an image vector to the input user query vector in the multimodal space, the image vector having the pre-selected length. The method also includes identifying, from an image database, an image associated with the image vector, and providing the image for display to the user in a results panel of a user interface.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
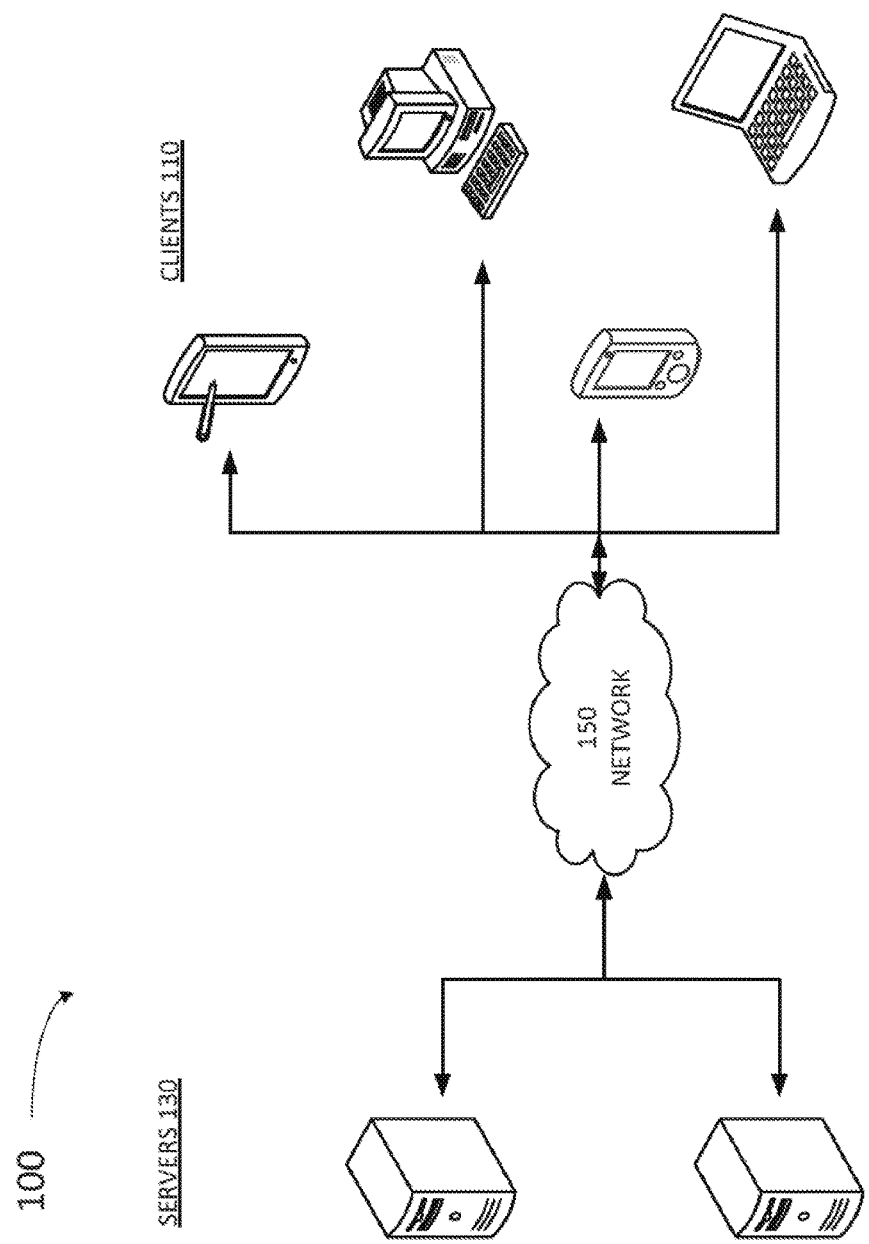
FIG. 1 illustrates an example architecture suitable for processing an image search query in multiple languages, according to some embodiments.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and, a label, or a caption associated with an image for identifying the image.

Search engines associated with multimedia databases encounter serious limitations when attempting to perform searches over queries entered in multiple languages. Embodiments disclosed herein include behavioral data from users (e.g., downloads from prior searches, regardless of the language used in the query) to rank (e.g., sort) the quality of an image for a given search and to provide an accurate and yet sufficiently broad scope of search results. In many instances, a word in a certain language may have multiple meanings when taken out of context, thereby generating confusion in translation-based search engines. Embodiments as disclosed herein include an embedding space for images and queries from multiple languages based on behavioral data as a learning environment for an image search engine. More specifically, queries that lead to downloads, clicks, or some other success event by one or more users may be provided a higher weighting factor in a language neural network (LNN) as disclosed herein. Also, embodiments consistent with the present disclosure include image vectors in the embedding space corresponding to images in the image database. When the user enters a query, the user query is embedded as a query vector into the embedding space, and a near neighbor set of image vectors close to the query vector is selected. Thereafter, images associated to the image vectors in the near neighbor set may be presented as search results for the user in a results panel of a user interface.

Indeed, in some embodiments a measure of a distance between vectors in an embedding space includes context information when a previous user history is considered (e.g., an "age factor," a "diversity factor," etc.), regardless of the specific language. Furthermore, some embodiments may also address an issue that arises when the same word has different meanings in two different languages. In such cases, some embodiments may include hints about user location and user preferred language (e.g., IP address location, chosen display language in the user interface, and other ancillary data including a language detection routine) as inputs to a language neural network that determines a query vector (QV) in the embedding space.

The proposed solution further provides improvements to the functioning of the computer itself because it saves data storage space and reduces network usage (e.g., during an image search in multiple languages).

Although many examples provided herein describe a user's search inputs being identifiable, or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

FIG. 1 illustrates an example architecture 100 for an image search with intersected predicted queries suitable for practicing some implementations of the disclosure. The architecture 100 includes servers 130 and clients 110 connected over a network 150. One of the many servers 130 is configured to host a memory including instructions which, when executed by a processor, cause the server 130 to perform at least some of the steps in methods as disclosed herein. In some embodiments, the processor is configured to search and find multimedia data files including images, video, music, and the like using text queries input by a user through client device 110. Further, in some embodiments the processor in server 130 is configured to find predicted queries from an input user query (IUQ), and to search and find multimedia data files using the predicted search queries. Accordingly, one of the many servers 130 also hosts a collection of images, videos, and multimedia files. The collection of multimedia files can be searched using an image search engine (e.g., accessible through a web page or an application running on one of clients 110). Servers 130 can return images tagged with an image score to clients 110 in response to the input user query (IUQ). Moreover, in some embodiments the processor is configured to associate the IUQ with a predicted query string from a query stream log. For purposes of load balancing, multiple servers 130 can host memories including instructions to one or more processors and multiple servers 130 can host the collection of images.

Servers 130 may include any device having an appropriate processor, memory, and communications capability for hosting the collection of images and the image search engine. The image search engine is accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example Automatic Video Summary System

Figure 2:
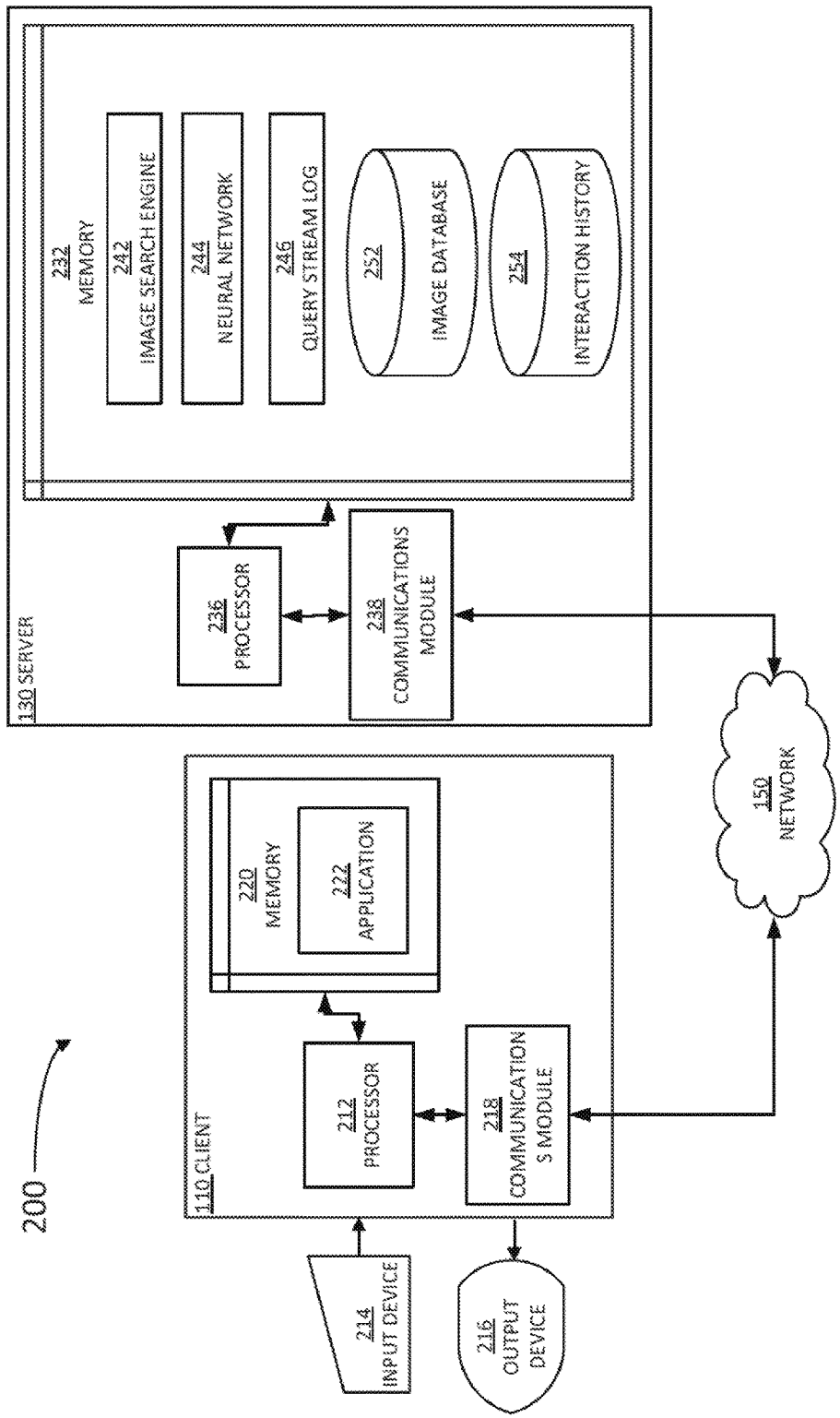
FIG. 2 is a block diagram illustrating an example server and client from the architecture of FIG. 1 according to certain aspects of the disclosure.

FIG. 2 is a block diagram 200 illustrating an example server 130 and client 110 in the architecture 100 of FIG. 1 according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Memory 232 includes an image database 252 and an image search engine 242 for searching image database 252. In one or more implementations, image database 252 represents a database that contains, for each image, a mapping from an image identifier to a data file containing pixel data for the image (e.g., in jpeg format).

Server 130 includes a memory 232, a processor 236, and communications module 238. Moreover, in some embodiments processor 236 is configured to obtain a set of predicted queries from a query stream log 246, from an interaction history information in an interaction history database 254, and from an IUQ received from a user through a user interface for image search engine 242. The user interface is displayed for the user in an output device 216 of client 110. Query stream log 246 includes a plurality of query strings previously used by one or more users interacting with image search engine 242. In some aspects, processor 236, using query stream log 246 and executing instructions from memory 232, can provide a set of predicted queries from query stream log 246 to image search engine 242. Processor 236 may also display the set of predicted queries to the user in a pull down menu of the user interface.

The user may access image search engine 242 through an application 222 or a web browser installed in client 110. Execution of application 222 may be controlled by a processor 212 in client 110. Image database 252 can be, for example, a dataset associated with images corresponding to a number of style classes (e.g., about 25). The images may be paired with image vector information and image cluster information. The image vector information identifies vectors representing a large sample of images (e.g., about 50 million) and the image cluster information identifies the vectors in one or more clusters such that each of the cluster of images represents a semantic concept.

Although image database 252 and image search engine 242 are illustrated as being in the same memory 232 of a server 130, in certain aspects the image database 252 and image search engine 242 can be hosted in a memory of a different server but accessible by server 130 illustrated in FIG. 2. In some embodiments, image search engine 242 is configured to execute commands and instructions from a neural network (NN) 244. NN 244 may include a LNN, a DNN, or a convolutional neural network (CNN).

Memory 232 also includes interaction history data 254. In certain aspects, processor 236 is configured to determine the interaction history data 254 by obtaining user interaction data identifying interactions with images from image search results that are responsive to search queries. For example, the processor 236 may determine that a user interacted with an image from a search result, such as by clicking on the image, saving the image for subsequent access, or downloaded the image to a client (e.g., client 110), or the like. The processor 236 may keep track of the user interactions with a number of images over a given time period. The interaction history 254 may also include data indicating search behavior (and/or patterns) relating to prior image search queries.

Processor 236 is configured to execute instructions, such as instructions physically coded into processor 236, instructions received from software in memory 232, or a combination of both. The IUQ identifies a user search query in a given natural language. For example, the search query may be entered as an English term or combination of terms. A user of client 110 may use input device 214 to submit a search term or phrase via a user interface of application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part). As described herein, the natural language used in image search engine 242 is not limited to English, and the natural language can vary to include other natural languages depending on implementation.

A search query is then provisioned to image search engine 242 for initiating the image search through image database 252. The IUQ is provided, for example, by the user accessing image search engine 242 over network 150 using application 222 in memory 220 on client 110. The user submits the IUQ using input device 214 of client 110. For example, the user may use input device 214 to enter a text-based search term or phrase. In response to the IUQ, a processor in client 110 transmits the search query over the network 150 using communications module 218 of client 110 to communications module 238 of server 130.

Processor 236, upon receiving the IUQ, submits a search request to image search engine 242. In some embodiments, processor 236 receives an identification of a plurality of images from image database 252 that are responsive to the IUQ and also to the set of predicted queries. The plurality of images from image database 252 may be sorted according to an image score (e.g., using interaction history database 254) indicating a probability of a user interaction for each image (e.g., the probability of a user clicking a thumbnail associated with one of the images). Processor 236 may then provide the listing of images to application 222 over network 150 for display by output device 216. The listing of images may include a plurality of thumbnails in a results panel of the user interface in output device 216.

Figure 3:
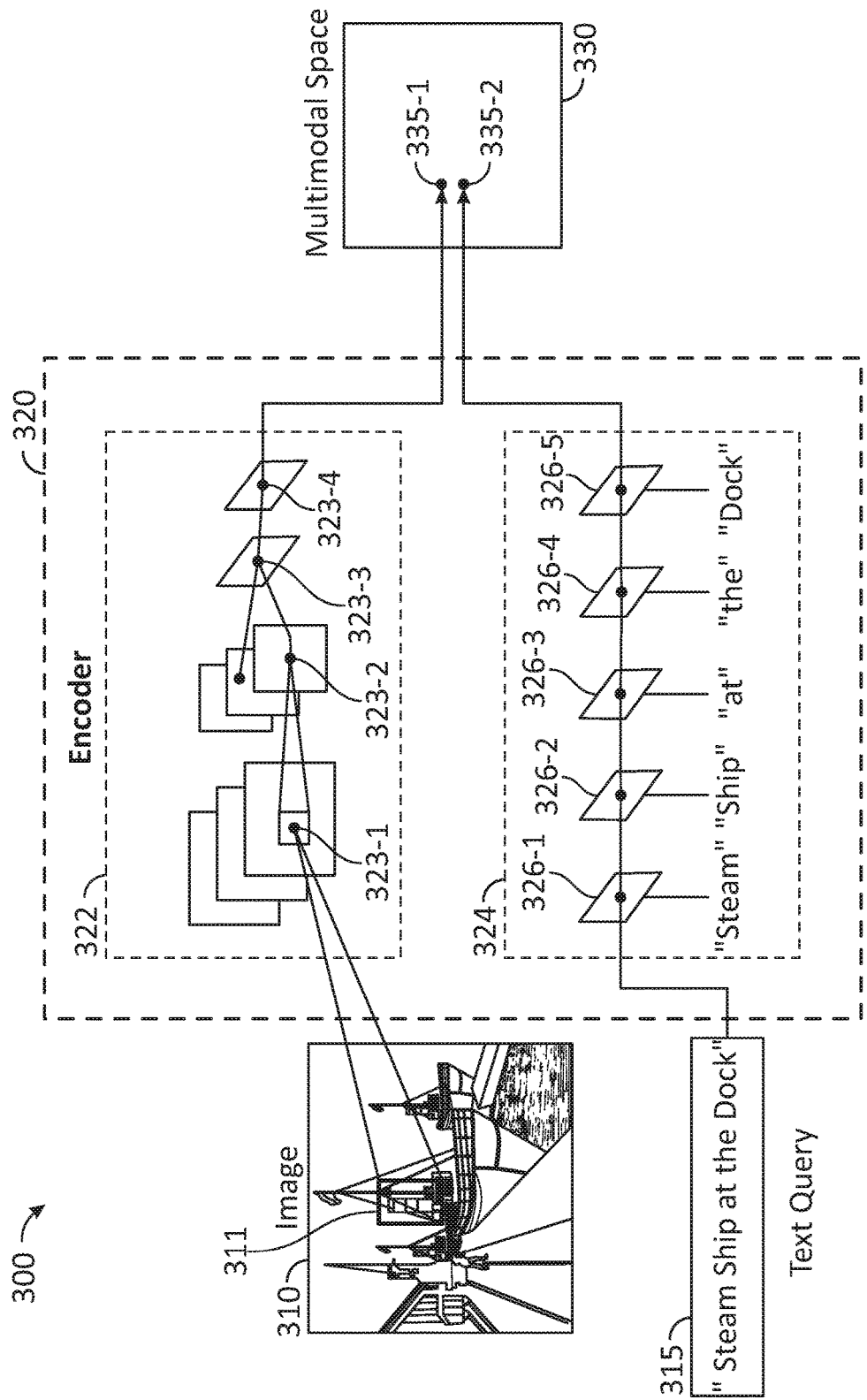
FIG. 3 is a block diagram illustrating a joint embedding of an image and an associated query in a multimodal space, according to some embodiments.

FIG. 3 is a block diagram illustrating a joint embedding 300 of an image 310 and an associated text query 315 in a multimodal space 330 using an encoder 320, according to some embodiments. Encoder 320 may be part of one or more processors in a server (e.g., processor 236 in server 130). Multimodal space 330 includes an image vector 335-1 and a text vector 335-2 having the same dimensionality (e.g., the dimensionality of multimodal space 330). In some embodiments, encoder 320 includes an image embedder 322 to provide image vector 335-1, and a query embedder 324 to provide text vector 335-2. Image embedder 322 may include a domain specific DNN classifier, which classifies image 310 into one of multiple classes. For example, image embedder 322 may select a feature 311 (e.g., a steam exhaust) to follow through a CNN classification with stages 323-1 through 323-4 (collectively referred to hereinafter as stages 323) to obtain image vector 335-1. The CNN classification includes a number of classes that may be derived from prior user searches and may increase as image database 252 increases in size. The number of classes may be in the hundreds, the thousands, or even more. In certain aspects, a convolutional neural network in image embedder 322 includes a stack of convolutional layers 323-1 and 323-2 followed by several fully connected layers (e.g., 323-3). The CNN may be part of NN 240 and can include a loss layer 323-4 (e.g., softmax or hinge loss layer) to back propagate errors so that the CNN learns and adjusts its weights to better fit provided image data.

In some embodiments, image embedder 322 and query embedder 324 in encoder 320 are trained using image 310 and associated text query 315 selected from the most popular queries with the images that were downloaded for those queries. Accordingly, image 310 may be one of the closest image searches retrieved for text query 315, and encoder 320 may be trained to obtain image vector 335-1 and text vector 335-2 close to one another in multimodal space 330.

Image embedder 322 and query embedder 324 take a piece of intelligible information and embed it into a dense vector space (e.g., multimodal space 330) such that similar pieces of information are close to each other regardless of whether they are related to image vector 335-1 or to text vector 335-2. A measure of distance in multimodal space 330 may be as normally defined in an N-dimensional space (where N is any integer number), such as a cosine distance, and the like. Some embodiments provide image captioning capabilities by looking in multimodal space 330 for a text vector 335-2 that is close to image vector 335-1. Moreover, multiple text vectors 335-2 may be associated with image vector 335-1 in a single language, or in multiple languages. Accordingly, joint embedding 300 may be used as a translation engine. For example, a first text query in a first language associated to a first text vector can be translated into a second text query in a second language associated to a second text vector, wherein the first text vector and the second text vector are close to one another in multimodal space 330. Such translation, though mediated by an image embedding (e.g., through the proximity of the first and second text vectors to image vector 335-1), may not involve displaying image 310 to the user.

In some embodiments, image embedder 322 includes a DNN having at least one of a classifier or a regressor. For example, in some embodiments a regressor model generates continuous variable output, whereas a classifier model generates discrete class labels. Alternatively, the DNN could be trained as a deep auto-encoder or as a generative adversarial network (GAN). In some embodiments, a GAN includes two competing NN models. A first NN model takes noise as input and generates samples (accordingly, the first NN is called the "generator"). A second NN model (e.g., the "discriminator") receives samples from both the generator and the training data, and distinguishes between the two sources. The generator NN and the discriminator NN play a continuous evolution where the generator is learns to produce more realistic samples, and the discriminator learns to improve the distinction between generated data from real data. In some embodiments, the generator NN and the discriminator NN are trained simultaneously, and the continuous evolution of the two NN models drives the generated samples to be indistinguishable from real data. In some embodiments a deep auto-encoder learns a representation (encoding) for a set of data, e.g., for the purpose of dimensionality reduction. In some embodiments, the DNN vision model is trained using semi-supervised techniques in which each image from the image database may include multiple soft labels. Once the model is trained an image embedding model selects a fixed length subset of network activations such that there is a fixed mapping from images to image vectors in the embedding space.

Query embedder 324 provides text vector 335-2 as a vector representation of text query 315, using a LNN having multiple layers 326-1 through 326-5 (hereinafter collectively referred to as "LNN layers 324"). Each one of LNN layers 326 is associated with one word from query 315. For example, when text query 315 is "Steam ship at the dock," layer 326-1 may be associated to the word "Steam," coupled with layer 326-2 associated with the word "ship," with layer 326-3 associated with the word "at," with layer 326-4 associated with the word "the," and with layer 326-5 associated with the word "dock." In some embodiments, the LNN maps variable length sentences (e.g., text query 315) into fixed length text vectors (text embedding) in multimodal space 330. In some embodiments, LNN may include a deep long short-term memory (LSTM) neural network.

In some embodiments, query embedder 324 is trained on positive and negative pairs of text queries 315 and images 310. For example, a positive pair includes image vector 335-1 and text vector 335-2, wherein image vector 335-1 is associated to an image 310 selected by one or more users from text query 315. The positive pair is included in a superset of the data used to train the image embedder. This superset may include millions of positively matched queries and images, thereby enhancing the accuracy of query embedder 324. A negative pair may include text query 315 randomly matched to image 310. In some embodiments, language embedder 324 is trained using a loss function that maximizes the difference between each positive and negative pair. For example, for each image 310 a positive pair and a negative pair may be determined. The training may then define a first distance between image and text vectors in the positive pair and a second distance between image and text vectors in the negative pair. Further, the training may select coefficients in the LNN of query embedder 324 such that a difference between the first distance and the second distance is maximized. Moreover, in some embodiments the training may select multiple positive distances associated with multiple positive pairs for image 310, and multiple negative distances associated with multiple negative pairs for the same image 310. Further, the training may select coefficients in the LNN of query embedder 324 such that an aggregate value of the positive distances is minimized while an aggregated value of the negative distances is maximized.

Figure 4:
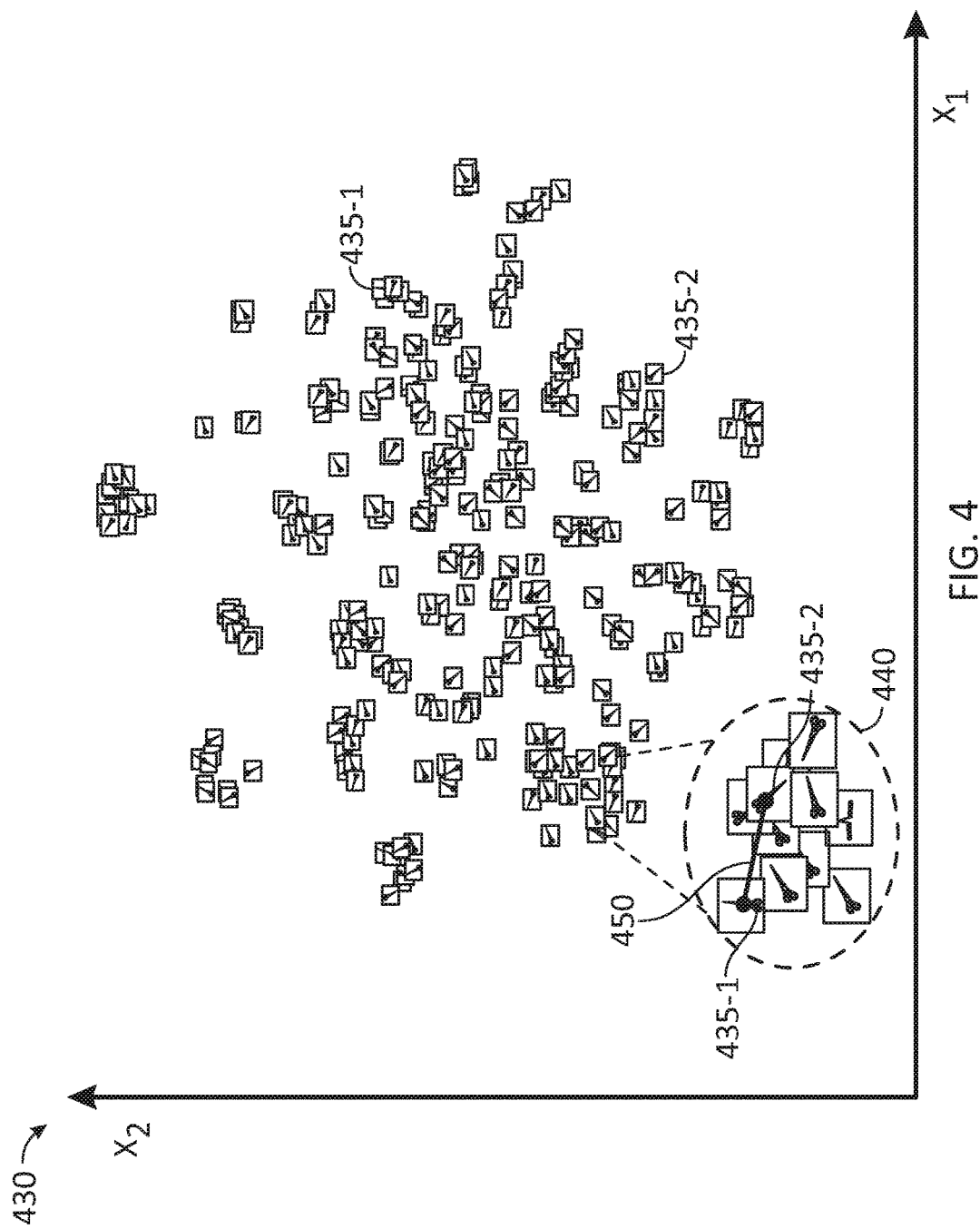
FIG. 4 illustrates a chart of a multimodal space including images and queries according to a joint embedding method as disclosed herein.

FIG. 4 illustrates a chart of a multimodal space 430 including image vectors 435-1 and text vectors 435-2 (hereinafter collectively referred to as "vectors 435"), according to a joint embedding method as disclosed herein. Vectors 435 have an abscissa $X_1$ and an ordinate $X_2$, selected by an encoder (e.g., encoder 320). Multimodal space 430 is dense, including multiple clusters 440 of closely related vectors 435. Each cluster 440 may be associated with images (e.g., image 310) belonging in a class of images. Further, each cluster 440 may be associated with conceptual representation of the images in the cluster. The conceptual representation of the images in the cluster may be expressed by multiple text vectors 435-2 obtained from text queries in one or more languages (e.g., text query 315).

Given a text query associated with a text vector 435-2, a results panel may include an image (e.g., image 310) associated with an image vector 435-1 selected based on a distance, D 450, between image vector 435-1 and a text vector 435-2. In some embodiments, D 450 is determined using a similarity measure, such as cosine distance. The cosine distance represents the relevance of an image associated with each image vector to the IUQV, according to the embedding model used by encoder 320. In some embodiments, and without limitation, a cosine distance between two vectors, $\vec{A}$, and $\vec{B}$, regardless of the—equal-dimensions of the vectors, may be obtained from the mathematical expression $$D = 1 - \frac{\vec{A} \cdot \vec{B}}{|\vec{A}||\vec{B}|}, \quad (1)$$

where the "dot" product "·" may be suitably defined for the vector space that includes vectors $\vec{A}$ and $\vec{B}$, and $|\vec{A}|$ and $|\vec{B}|$, are generally "lengths" associated to vectors $\vec{A}$ and $\vec{B}$, respectively, in the vector space.

Accordingly, the results panel may include a set of near neighbor images selected such that D 450 is less than a pre-selected threshold (e.g., one or more image vectors 435-1 within cluster 440).

To illustrate how a joint embedding procedure derived from multimodal space 430 mitigates the cold start problem, Table I lists results for an embodiment using 100,000 exemplary search queries on multimodal space 430 as compared to a traditional search engine. Columns 1 and 2 include results for the top 100 images and columns 3 and 4 include average results for the top 20 images in the results panel, over the universe of search queries (e.g., 100,000). The values in Table I correspond to the percentage of images newer than 1 month and 3 months in the corresponding results panel (e.g., top 100 images or top 20 images), for all queries. As can be seen by the results below, the joint embedding ranker exposes more than twice as many images newer than three months as compared to a traditional ranker. The joint embedding ranker exposes an even higher multiple of images newer than one month.

TABLE I

| Ranker | Top 100 Newer than 1 month | Top 100 Newer than 3 months | Top 20 Newer than 1 month | Top 20 Newer than 3 months |
| --- | --- | --- | --- | --- |
| Traditional | 0.72% | 4.71% | 0.28% | 4.02% |
| Joint Embedding | 2.68% | 9.6% | 2.59% | 9.35% |

These results consider each of the 100,000 queries equivalently, but the most popular query is searched for approximately 1,000 times more often than 100,000th most popular. Accordingly, Table II takes into account the number of executions of each query in the results. Since a traditional search engine prefers images with more prior behavioral data, it is expected that traditional search engines show a greater bias towards older images for the most common queries (e.g., substantially lower percentages across all columns in the first row of Table II). Indeed, the data in Table II, normalized by number of executions of each query, indicates a more pronounced cold start correction for the joint embedded strategy.

TABLE II

| Ranker | Top 100 Newer than 1 month | Top 100 Newer than 3 months | Top 20 Newer than 1 month | Top 20 Newer than 3 months |
| --- | --- | --- | --- | --- |
| Traditional | 0.47% | 4.33% | 0.21% | 3.07% |
| Joint Embedding | 2.63% | 9.36% | 2.54% | 9.25% |

To further mitigate the cold start problem, some embodiments include leveraging D 450 to mitigate the cold start problem. For example, in some embodiments D 450 may be modified according to an "age factor" (AF) associated with image vector 435-1. The AF is obtained by identifying the age of each image vector 435-1 in cluster 440. The age may be the number of days that an image associated with each image vector 435-1 has been in the image database. Without limitation, one exemplary age factor may be obtained as $$AF = \alpha/(\Delta/365 + \beta) \quad (2)$$

where $\Delta$ is the age of the image in the image database (e.g., in days), $\alpha$ is a predetermined decay factor, and $\beta$ is a predetermined offset. In some embodiments, the values $\alpha$ and $\beta$ are determined by running a large number of values and determining which gives the optimal balance between the desired image properties of novelty and relevance to the user. Furthermore, the processor may be configured to obtain a "weighted" distance "wD" for each image in the near neighbor set, e.g., by multiplication: wD=D×AF, to obtain the age weighted result, wD. Accordingly, a new set of near neighbor image vectors 435-1 may be selected within cluster 440 based on the weighted distance wD.

Figure 5:
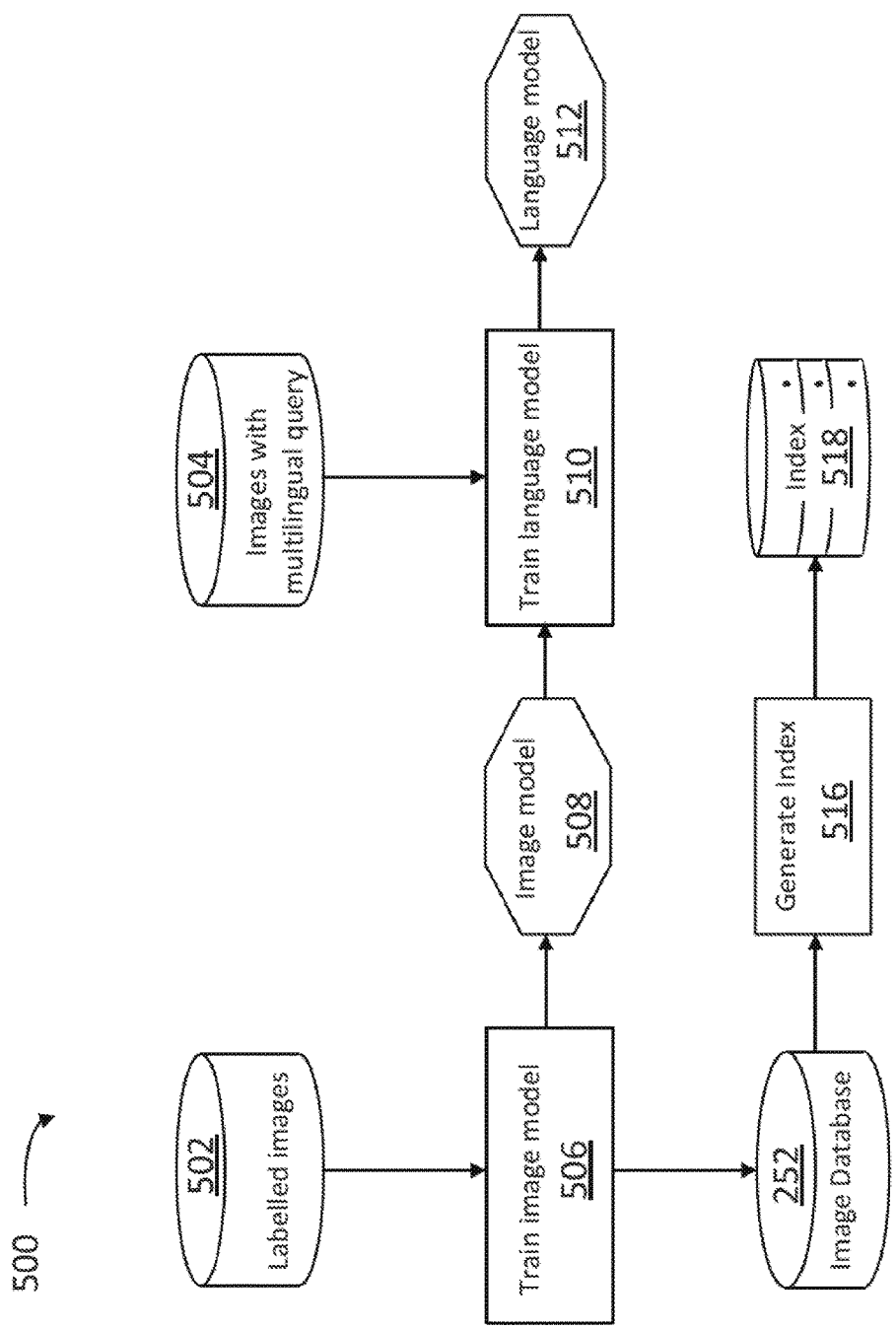
FIG. 5 is a block diagram for a method to create a multimodal space including an index of feature vector for images in a searchable collection, according to some embodiments.

FIG. 5 is a block diagram 500 for a method to create a multimodal space including an index of feature vectors for images in a searchable collection, according to some embodiments. Block diagram 500 may be implemented in a server communicatively coupled with at least one client device through a network (e.g., server 130, client device 110, and network 150). The server may include a memory and a processor, wherein the memory may include, or may have access to, an image database including a plurality of image files (e.g., memory 232, processor 236, and image database 252). The user may be interested in searching for at least one of the images in the image database by entering a query in any of multiple languages into a search engine that may be part of the server processor.

The processor includes commands stored in the memory. In some embodiments, the commands include an encoder having an image embedder and a query embedder (e.g., encoder 32, image embedder 322, and query embedder 324). The processor may be configured to add image vectors and query vectors to a multimodal space (e.g., image vector 335-1, query vector 335-2, and multimodal space 330), and train a DNN prior to a user interaction.

A set of labelled images 502 is used in 506 to train an image model 508. Image model 508 and a set 504 of images with multilingual queries are used in 510 to train a language model 512. Once image model 508 and language model 512 are trained (e.g., through image embedder 322 and query embedder 324), they are used to generate an index 516 and create an index database 518 of image vectors for all, or almost all the images in image database 252. The steps to create the image vectors include, for each image in the image database, using the image embedding DNN to create an image feature vector (IFV) space which is a subset of the multimodal space. In some embodiments, the steps to create the image vector include using the language model to create a feature vector in the embedding space for the IFV and storing the feature vector along with a pointer back to the text query.

In some embodiments, index database 518 may include a N×M matrix that stores image vectors for N images, each of size M in the multimodal space. A separate N×1 vector is maintained as a pointer from the image vector to the image in the image database that was used to generate the image vector (e.g., image 310 and image vector 335-1).

Figure 6:
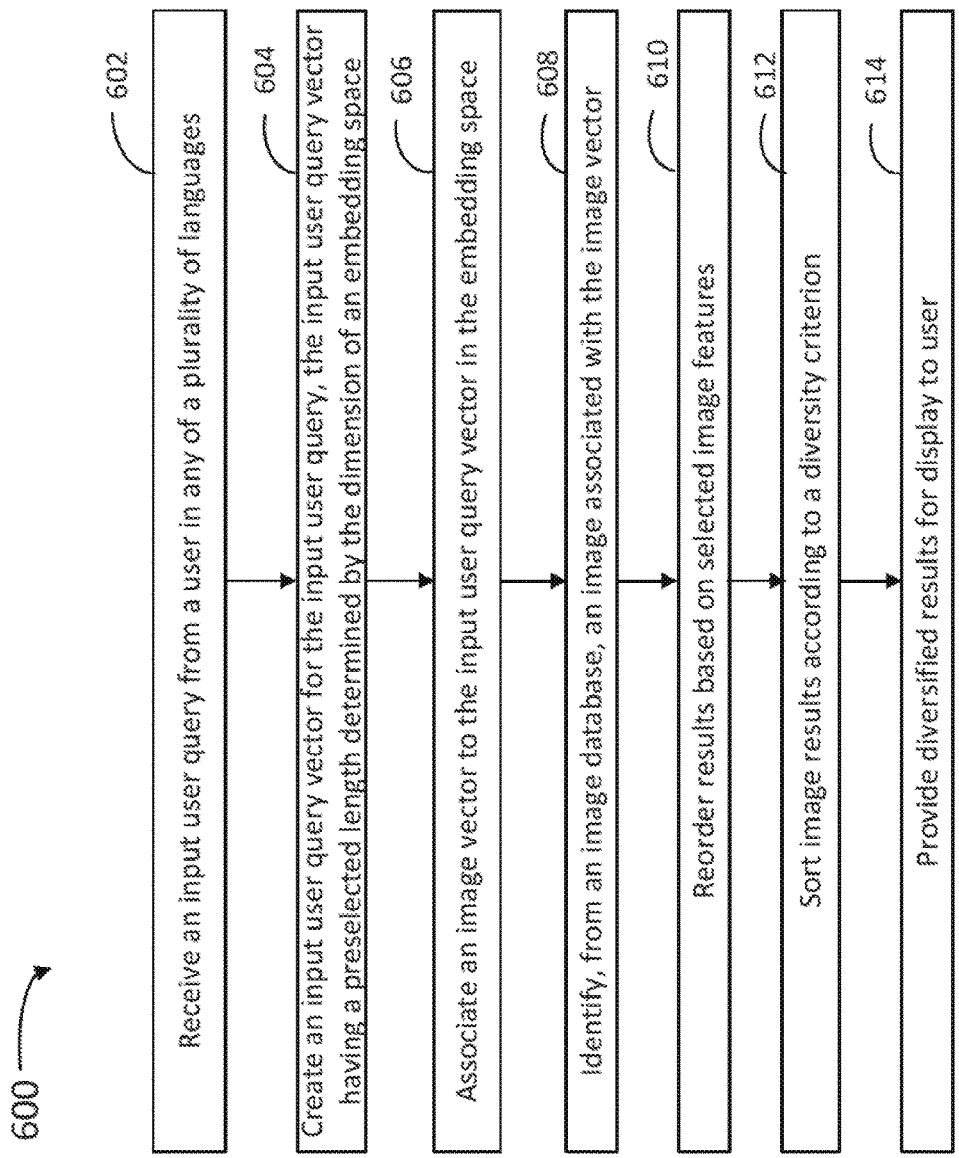
FIG. 6 is a flow chart illustrating steps in a method to provide a search result in a multi-language query from a user, according to some embodiments.

FIG. 6 is a flow chart illustrating steps in a method 600 to provide a search result in a multi-language query from a user, according to some embodiments. Method 600 may be performed at least partially by any one of network servers hosting a collection of images, videos, and multimedia files (e.g., images and video clips), while communicating with any one of a plurality of client devices (e.g., any one of servers 130 and any one of clients 110). The client devices may be handled by a user, wherein the user may be registered to a private account with the server, or may be a visitor to the server website or logged in a server application installed in the client device. At least some of the steps in method 600 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer, using, inter-alia, an image search engine (e.g., image search engine 242). The database may include any one of an image database, a query stream log and an interaction history database (e.g., image database 252, query stream log 246 and interaction history database 254). Methods consistent with the present disclosure may include at least some, but not all of the steps illustrated in method 600, performed in a different sequence. Furthermore, methods consistent with the present disclosure may include at least two or more steps as in method 600 performed overlapping in time, or almost simultaneously.

Step 602 includes receiving an input user query from a user in any of a plurality of languages. In some embodiments, step 602 includes determining a customer segment.

Step 604 includes creating an input user query vector for the input user query, the input user query vector having a preselected length determined by the dimension of an embedding space. In some embodiments, step 604 includes translating a group of terms in the input user query into a fixed set of coordinates of the input user query vector using a language neural network.

Step 606 includes associating an image vector to the input user query vector in the embedding space. In some embodiments, step 606 may include finding the image vector within a pre-selected distance from the input user query vector (e.g., within cluster 440).

Step 608 includes identifying, from an image database, an image associated with the image vector. In some embodiments, step 608 includes selecting the image from a pointer associated with the image vector in an index database. In some embodiments, step 608 includes correlating the image vector with the image using a convolved neural network.

Step 610 includes reordering results based on selected image features. In some embodiments, step 610 includes reordering a plurality of image results based on a selected image feature (e.g., AF, cf. Eq. 2).

Step 612 includes sorting the image results according to a diversity criterion. In some embodiments, step 612 may include post processing of the search results to identify the diversity criterion. To enhance image "diversity" and to avoid presenting the user with too many similar images seemingly equivalent to one another in the search result, the processor may be configured to rely less heavily on distance between vectors in visual space and avoid dominance of a large number of search results that are visually highly similar.

To enhance diversity, in some embodiments the processor defines an expansion factor, "f," that accounts for the potential collapsing of a number "q" of search results to a number "q/f" of search results once diversity is enforced. The value off may be tuned by using the system repeatedly and determining a value that ensures with some confidence level that there will be enough results to cover a selected quota, "k," of results desired to be displayed on a user interface (e.g., a server webpage on the display of the client device).

Further, the processor defines a similarity threshold "t," to capture the notion of a pair of images in the near neighbor set to be visually similar. In some embodiments, the processor determines a value for the similarity threshold by generating a set of results using the proposed system for different values of t, and determining which value of t provides a desirable balance between increasing diversity and maintaining relevancy of the images in the near neighbor set. It is desirable that the set of results used by the processor to determine t be as large as possible, within computational feasibility.

More specifically, in a method for determining the similarity threshold, t, the processor inputs a list "S," including "ss" images in the near neighbor set ordered by score regarding a certain image property, where ss is any integer up to the size of the near neighbor set. For example, the ss images in list S may be the ss images in the near neighbor set having image vectors closest to the IUQV. The processor may further create an empty set "P" which will become the post-processed near neighbor set, as follows.

For each image "i" in set S, the processor is configured to further perform the step of verifying whether there are images in set P. For each image "j" found in the set P, the processor verifies the visual similarity of image "i" in set S and image "j" in set P. If the visual similarity is greater than the similarity threshold, t, then the processor moves to the next image "i." If the image similarity between image i in set S is lower than the similarity threshold for all images in P, the image i is not highly similar visually to any image already in P and therefore the processor adds image i to the set P. When the set P contains fewer than k images, the processor is configured to repopulate S with the next ss images from the near neighbor set and the above steps are repeated. When the set P contains a selected quota of k images, then the set P is complete and is presented to the user in a results panel in the user interface.

In yet other embodiments, a method performed by a user with a client device communicatively coupled to a server through a network includes providing a user input query via an application on a client device (e.g., client device 110 and server 130). The input user query may include a text string in any one of a plurality of languages. In one step of the method, the user may adjust a threshold value for enhancing a diversity of a plurality of search results. The method performed by the user may further include selecting an image from a results panel displayed on a user interface in a display of the client device.

A further refinement to the above is to dynamically change the results based on preferences exhibited by the user. Preferences can be gathered by looking at the current session or by looking through the last V days of user activity, where V is a suitably chosen integer. Accordingly, the processor mines either a current session between server and client, or the last V days of user activity. The processor extracts all image preferences exhibited during the selected sessions, for example, the processor may select at least some of the images in the image database or in the near neighbor set that the user has downloaded or clicked on.

The processor looks up the image vectors in the embedding space for the images for which the user has shown a preference and averages the image vectors of the images for which the user has shown preference. Thus, the processor identifies a most prevalent location in the embedded space associated with the user. Alternatively, in some embodiments the processor clusters the images using the image vectors in the embedded space.

When the user enters a query, the processor may apply a boosting factor, "b," for images in the near neighbor set. The boosting factor may be selected to favor at least one of the images in the near neighbor set over the others. For example, a boosted score "bSc" may be defined as:

$$bSc = b \times Sc \qquad (3)$$

Accordingly, when a cosine distance between the near neighbor candidate and the IUQV is larger than a threshold "tb" (e.g., tb=0.9), then boost factor b is a value greater than 1, which may depend on the value of the cosine distance: a greater b for a greater cosine distance—to enhance image diversity-. When the cosine distance between near neighbor candidate and the QV is less than tb, then the boost value may be set equal to one (b=1), with essentially no boost to the candidate image score.

In embodiments that use clusters to boost multiple preferences, the boost would be the maximum value (or close to the maximum value) of a set of boosts from each cluster associated to an image property.

Step 614 includes providing the diversified results for display to the user. In some embodiments, step 614 includes sorting a group of images according to a proximity of an associated image vector for each image with the input user query vector. In some embodiments, step 614 may include identifying a translated query in a language different from a language of the input user query, the translated query associated with a user query vector that is close to the image vector in the multimodal space.

Figure 7:
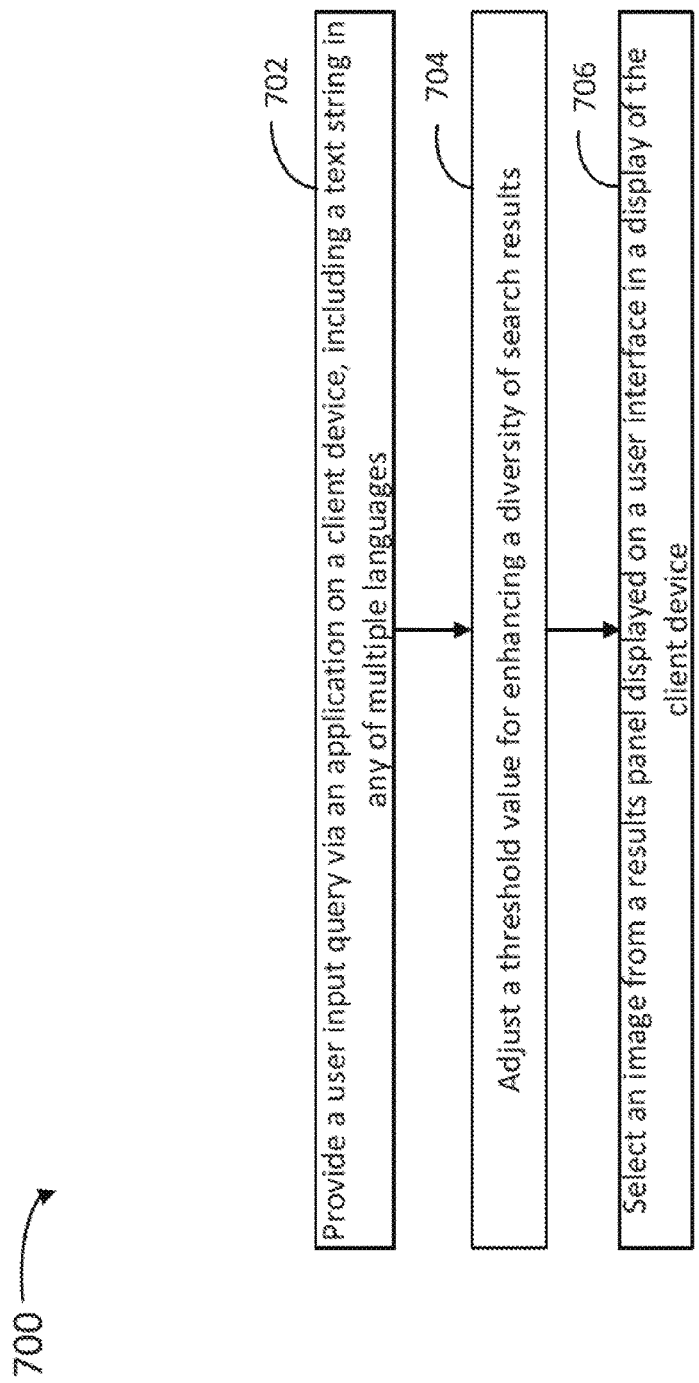
FIG. 7 is a flow chart illustrating steps in a method to perform a search via an application on a client device.

FIG. 7 is a flow chart illustrating steps in a method 700 to perform a search via an application on a client device. Method 700 may be performed at least partially by any one of client devices (e.g., any one of servers 130 and any one of clients 110) communicating with any one of network servers hosting a collection of images, videos, and multimedia files (e.g., images and video clips). The client devices may be handled by a user, wherein the user may be registered to a private account with the server, or may be a visitor to the server website or logged in a server application installed in the client device. At least some of the steps in method 300 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer, using, inter-alia, an image search engine (e.g., image search engine 242). The database may include any one of an image database, a query stream log and an interaction history database (e.g., image database 252, query stream log 246 and interaction history database 254). Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

Step 702 includes providing a user input query via an application on a client device, wherein the input user query includes a text string in any one of multiple languages.

Step 704 includes adjusting a threshold value for enhancing a diversity of search results.

Step 706 includes selecting an image from a results panel displayed on a user interface in a display of the client device.

Figure 8A:
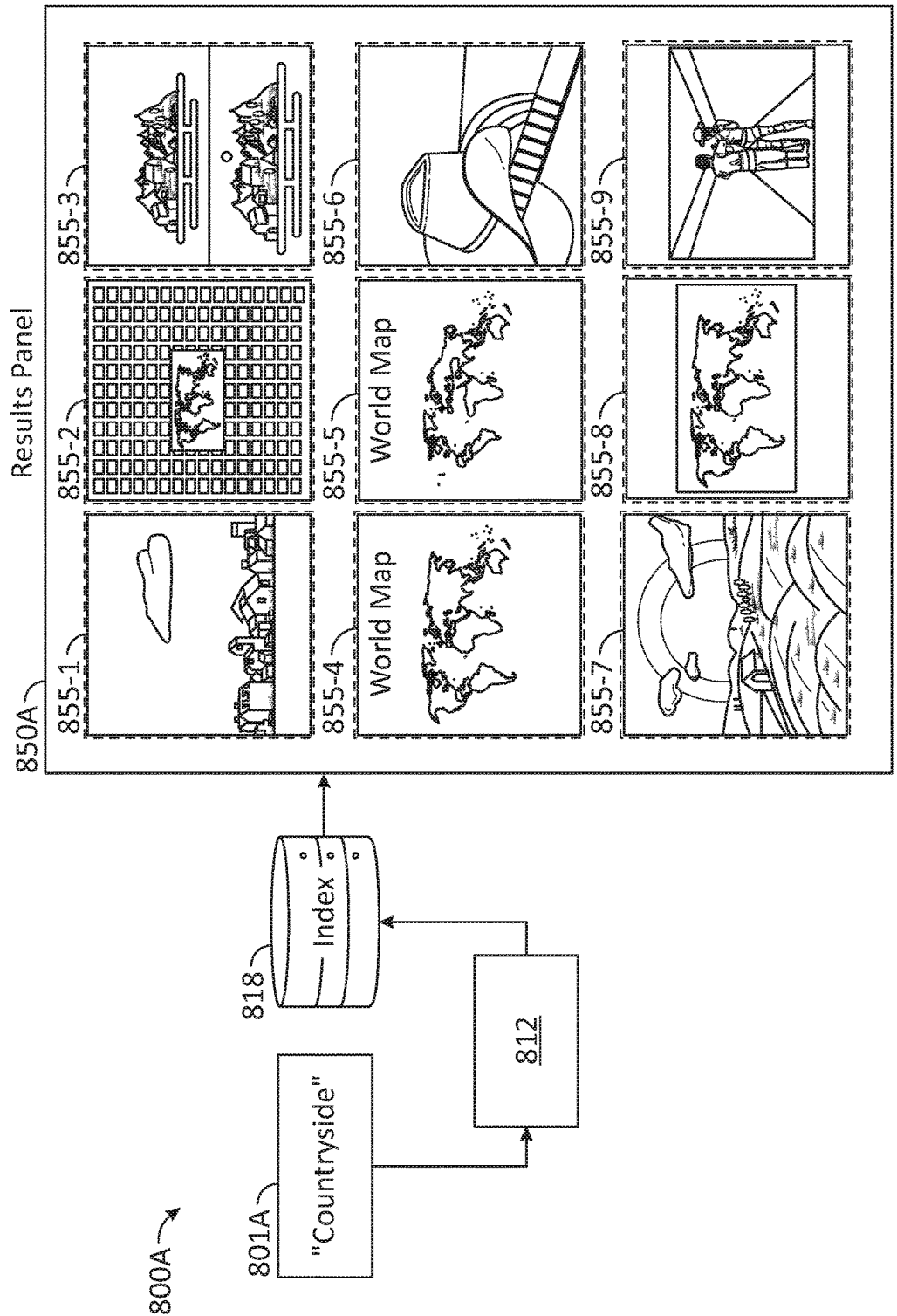
FIG. 8A is a walk-through illustration of a textual translation search for searching an image with a multi-language query, according to some embodiments.

FIG. 8A is a walk-through illustration of a textual translation search 800A for searching an image with a multi-language query, according to some embodiments. The user enters an input user query 801A in any of a plurality of languages. Processor 812 performs steps to provide image results 855-1 through 855-9 (hereinafter collectively referred to as image results 855) from an index database 818 in a results panel 850A. For example, and without limitation, the user may enter the Russian word for "countryside" as IUQ 801A. Image results 855 include a wide variety of different images, which means that the search engine has diversified the search scope efficiently, thus providing a wider and more relevant range of options to the user.

In some embodiments, textual translation search 800A may include a language translator that literally translates the Russian characters into the English characters (e.g., "countryside") and enters the English characters into IUQ 801A. When this is the case, image results 855 may be overly broad, and include, for example, images 855-2, 855-4, 855-5, or 855-8, associated with "countries of the world," or image 855-6 that is associated to "country music." While in some embodiments results panel 850A may be desirable, in some embodiments the user is more specifically looking for "bucolic" pictures of the countryside. This concept may be best captured by the specific characters in the Russian query, rather than the translation into English.

Figure 8B:
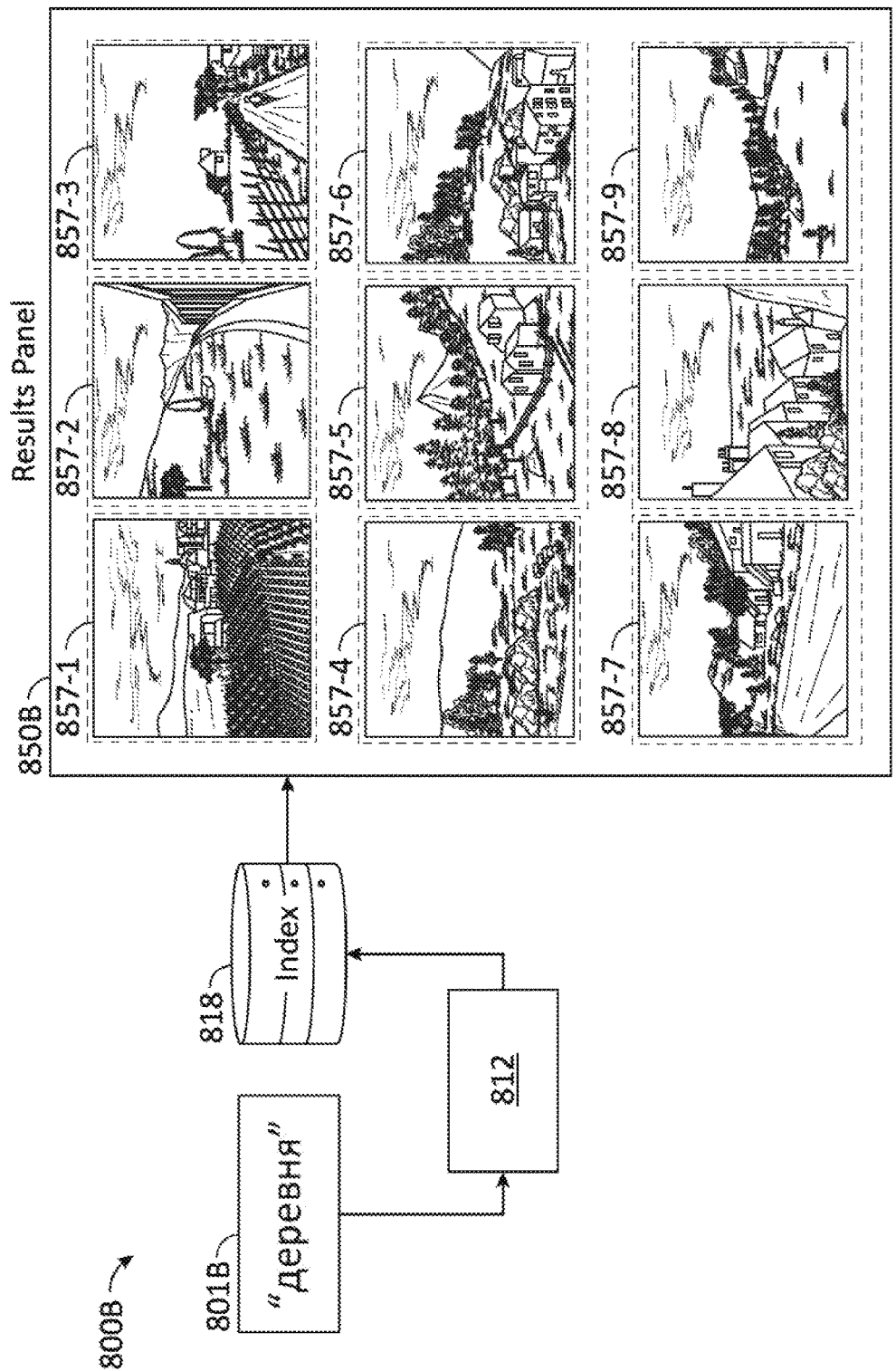
FIG. 8B is a walk-through illustration of a joint embedded search for searching an image with a multi-language query in a multimodal space, according to some embodiments.

FIG. 8B is a walk-through illustration of a joint embedded search 800B for searching an image with a multi-language query in a multimodal space (e.g., multimodal space 330, or multimodal space 430), according to some embodiments. The user enters an input user query 801B in any of a plurality of languages. Processor 812 performs steps to provide image results 857-1 through 857-9 (hereinafter collectively referred to as image results 857) from an index database 818 in a results panel 850B. For example, and without limitation, the user may enter the Russian word for "countryside" as IUQ 801B. In some embodiments, processor 812 may create an input user query vector straight from the Russian characters of IUQ 801B. When this is the case, image results 857 may be more narrowly selected, and include mostly "bucolic" pictures of the countryside, more along the ultimate user intentions, thereby results panel 850B provides a more efficient search and a more pleasant user experience.

In addition to mitigating the cold start problem, joint embedded search 800B as disclosed herein is able to perform multilingual searches (over 20 languages) without having to perform a direct translation or the use of a language detection process.

While a user can set the display language of the site, the setting alone will not predict what language the user will search in. In some embodiments, a multimodal space as disclosed herein may be used as a translation machine: A working translation system for search requires the capability to translate both words and phrases. A proper translation system requires language specific information retrieval knowledge—segmentation, stemming, and character normalization all have different rules in each language. Along with the aspects above, the search system has to handle multilingual search problems, such as terms that have multiple translations in the target language and queries that includes words from multiple languages. In addition to the challenge of requiring many different technical skills, the dependencies in such a system make enhancements difficult. An improvement to language detection might negatively affect the accuracy of translation, a change to the translation system could require a corresponding change to the search configuration, and the like. Some embodiments include building a multilingual search system without requiring a deep breadth of expertise. FIGS. 8A-B, illustrate examples of words that have multiple meanings where each meaning are restricted to a set of the word forms.

Hardware Overview

Figure 9:
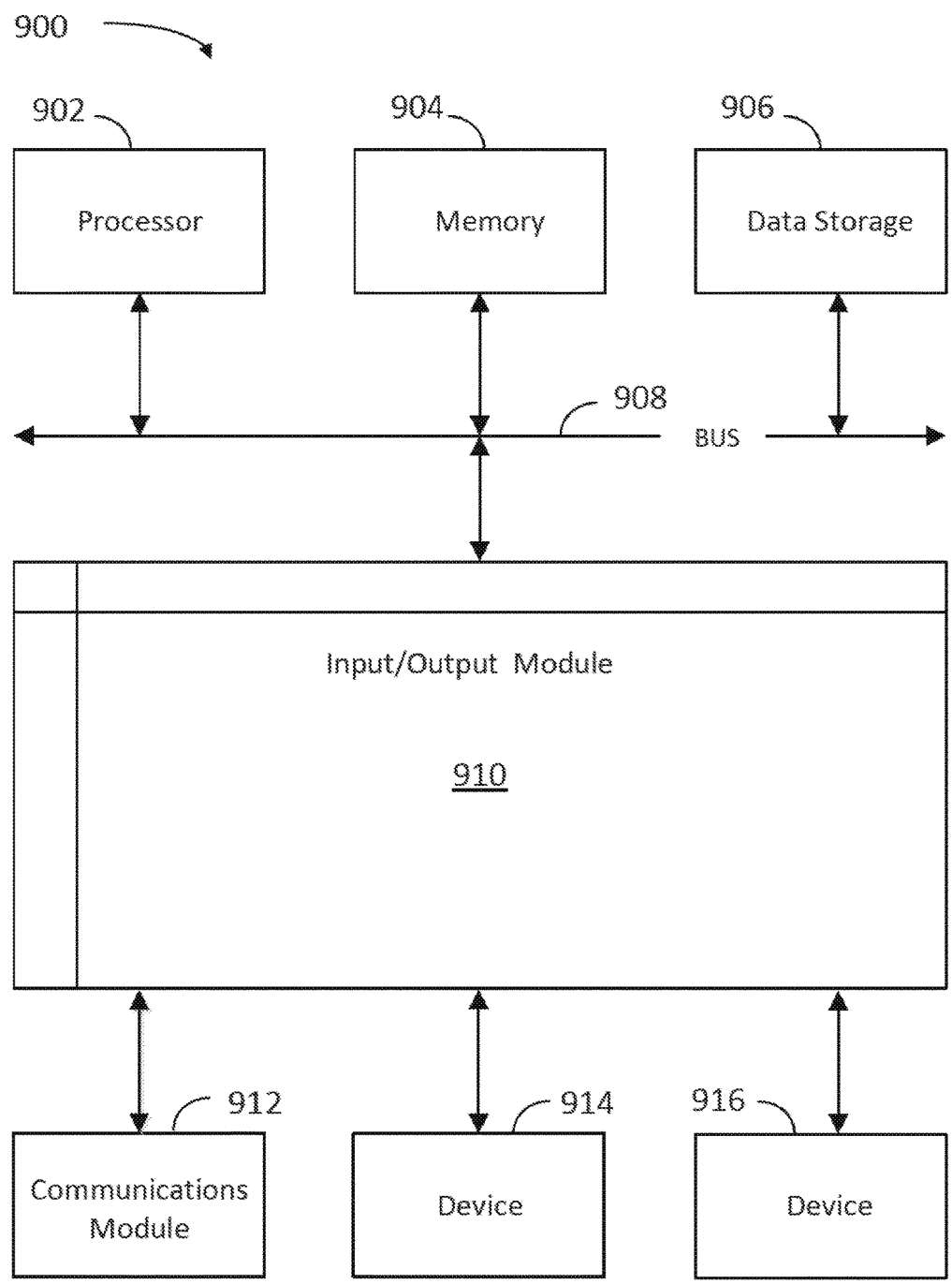
FIG. 9 is a block diagram illustrating an example computer system with which the client and server of FIGS. 1 and 2, and the methods of FIGS. 6 and 7 can be implemented.

FIG. 9 is a block diagram illustrating an exemplary computer system 900 with which the client 110 and server 130 of FIGS. 1 and 2, and the methods of FIGS. 6 and 7 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as a LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving an input user query from a user in at least one language selected from multiple languages;
creating an input user query vector for the input user query, the input user query vector having a length equal to a pre-selected length determined by a dimension of a multimodal space;
associating an image vector to the input user query vector in the multimodal space, the image vector having the pre-selected length;
identifying, from an image database, an image associated with the image vector;
providing the image for display to the user in a results panel of a user interface;
selecting a plurality of image results based on a similarity threshold to include image results that are beyond the similarity threshold in a search result set;
repopulating the search result set with a new similarity threshold when a number of image results is less than a pre-selected quota of the search result set; and
translating the input user query between at least two of the languages with two text vectors that are in proximity of the image vector in the multimodal space.

2. The method of claim 1, wherein creating an input user query vector from the input user query comprises translating a group of terms in the input user query into a fixed set of coordinates of the input user query vector using a language neural network.

3. The method of claim 1, wherein associating an image vector to the input user query comprises finding the image vector within a pre-selected distance from the input user query vector.

4. The method of claim 1, wherein identifying an image from an image database comprises selecting the image from a pointer associated with the image vector in an index database.

5. The method of claim 1, wherein identifying an image from an image database comprises correlating the image vector with the image using a convolutional neural network.

6. The method of claim 1, further comprising reordering a plurality of image results based on a selected image feature, wherein the selected image feature is an age factor.

7. The method of claim 1, further comprising sorting a plurality of image results according to a diversity criterion.

8. The method of claim 1, further comprising identifying a translated query in a language different from a language of the input user query, the translated query associated with a user query vector that is close to the image vector in the multimodal space.

9. A system comprising:
one or more processors; and
a memory coupled to the one or more processors, the memory including instructions that, when executed by the one or more processors, cause the one or more processors to:
receive an input user query from a user in at least one language selected from multiple languages;
create an input user query vector for the input user query, the input user query vector having a length equal to a pre-selected length determined by a dimension of a multimodal space;
associate an image vector to the input user query vector in the multimodal space, the image vector having the pre-selected length;
identify, from an image database, an image associated with the image vector;
provide the image for display to the user in a results panel of a user interface;
select a plurality of image results according to a diversity criterion, the diversity criterion based on a similarity threshold to include image results beyond the similarity threshold in a search result set;
repopulate the search result set with a new similarity threshold when a number of image results is less than a pre-selected quota of the search result set and
translate the input user query between at least two of the languages with two text vectors that are in proximity of the image vector in the multimodal space.

10. The system of claim 9, wherein to create an input user query vector from the input user query the memory comprises instructions to translate a group of terms in the input user query into a fixed set of coordinates of the input user query vector using a language neural network.

11. The system of claim 9, wherein to associate an image vector to the input user query the memory comprises instructions for finding the image vector within a pre-selected distance from the input user query vector.

12. The system of claim 9, wherein to identify an image from an image database the memory comprises instructions to select the image from a pointer associated with the image vector in an index database.

13. The system of claim 9, wherein to identify an image from an image database the memory comprises instructions to correlate the image vector with the image using a convolutional neural network.

14. The system of claim 9, wherein to display the image for the user the memory comprises instructions to repopulate a set of image results with a new similarity threshold when a number of image results is less than a pre-selected quota.

15. The system of claim 9, wherein the memory further comprises instructions to reorder a plurality of image results based on a selected image feature, wherein the selected image feature is an age factor.

16. The system of claim 9, wherein the memory further comprises instructions to sort a plurality of image results according to a diversity criterion.

17. The system of claim 9, wherein the memory further comprises instructions to identify a translated query in a language different from a language of the input user query, the translated query associated with a user query vector that is close to the image vector in the multimodal space.

18. The system of claim 9, wherein to reorder a plurality of image results based on selected image features, the memory further comprises instructions to identify a boost factor proportional to a distance of the image vector to the input user query vector in the multimodal space.

19. A computer-implemented method comprising:
providing a user input query via an application on a client device, wherein the input user query includes a text string in any one of multiple languages;
selecting a diversity factor and an age factor for images in a search result set, wherein the search result set includes images selected from a database according to a similarity threshold obtained from the diversity factor;
selecting a quota of search results in the search result set based on the diversity factor;

adjusting a threshold value for enhancing a diversity of search results based on the quota of search results to be displayed;
selecting an image from a results panel displayed on a user interface in a display of the client device; and
receiving a translated text of the user input query into a second one of the languages based on a similarity of the image with a meaning of the translated text.

\* \* \* \* \*